(12) United States Patent
Kiefer et al.

(10) Patent No.: US 11,748,410 B2
(45) Date of Patent: *Sep. 5, 2023

(54) SYSTEM AND METHOD FOR PRE-INDEXING FILTERING AND CORRECTION OF DOCUMENTS IN SEARCH SYSTEMS

(71) Applicant: OPEN TEXT HOLDINGS, INC., San Mateo, CA (US)

(72) Inventors: Bruce Edward Kiefer, Denver, CO (US); Gregory John Berka, Centennial, CO (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,710

(22) Filed: Oct. 12, 2021

(65) Prior Publication Data

US 2022/0067094 A1 Mar. 3, 2022

Related U.S. Application Data

(63) Continuation of application No. 16/582,882, filed on Sep. 25, 2019, now Pat. No. 11,176,198.

(51) Int. Cl.
| | | |
|---|---|---|
| G06F 7/02 | (2006.01) | |
| G06F 16/00 | (2019.01) | |
| G06F 16/901 | (2019.01) | |
| G06F 16/93 | (2019.01) | |
| G06F 40/10 | (2020.01) | |
| G06F 16/14 | (2019.01) | |
| G06F 40/284 | (2020.01) | |
| G06F 16/2458 | (2019.01) | |
| G06F 16/31 | (2019.01) | |

(52) U.S. Cl.
CPC ............ *G06F 16/901* (2019.01); *G06F 16/93* (2019.01); *G06F 16/144* (2019.01); *G06F 16/2465* (2019.01); *G06F 16/316* (2019.01); *G06F 40/10* (2020.01); *G06F 40/284* (2020.01)

(58) Field of Classification Search
CPC ...... G06F 16/901; G06F 16/93; G06F 16/144; G06F 16/316; G06F 16/2465; G06F 40/284; G06F 40/10
See application file for complete search history.

(56) References Cited

U.S. PATENT DOCUMENTS

| | | | |
|---|---|---|---|
| 11,397,776 B2 * | 7/2022 | Huang | G06F 16/3347 |
| 2009/0300007 A1 * | 12/2009 | Hiraoka | G06F 16/93 707/999.005 |

(Continued)

*Primary Examiner* — Bruce M Moser
(74) *Attorney, Agent, or Firm* — SPRINKLE IP LAW GROUP

(57) ABSTRACT

Embodiments as disclosed herein provide a search system with an pre-indexing filter that provides both a sophisticated and contextually tailored approach to filtering documents and a corrector that is adapted to alter a document that has been designated to be filtered out from the indexing process and determine if the altered document should be indexed. The alteration of the document may be tied to the attributes, rules or thresholds used to initially filter the document from the indexing process. The filtering criteria can thus be tailored to a specific context such that both the initial filtering and the alteration process may be better suited for application in that context.

21 Claims, 2 Drawing Sheets

(56) References Cited

U.S. PATENT DOCUMENTS

| | | | |
|---|---|---|---|
| 2014/0229164 A1* | 8/2014 | Martens | G06F 40/169 |
| | | | 704/9 |
| 2014/0280166 A1* | 9/2014 | Bryars | G06F 16/245 |
| | | | 707/738 |
| 2016/0210426 A1* | 7/2016 | Robinson | G06Q 10/10 |
| 2020/0226164 A1* | 7/2020 | Eifert | G06F 16/3334 |
| 2020/0250678 A1* | 8/2020 | Yoneda | G06F 16/9537 |
| 2020/0349177 A1* | 11/2020 | Maan | G06F 16/3326 |
| 2020/0387668 A1* | 12/2020 | Yokote | G06F 40/194 |

* cited by examiner

SYSTEM AND METHOD FOR PRE-INDEXING FILTERING AND CORRECTION OF DOCUMENTS IN SEARCH SYSTEMS

CROSS-REFERENCE TO RELATED APPLICATIONS

This application is a continuation of, and claims a benefit of priority under 35 U.S.C. 120 of the filing date of U.S. patent application Ser. No. 16/582,882, filed Sep. 25, 2019, now U.S. Pat. No. 11,176,198, entitled "SYSTEM AND METHOD FOR PRE-INDEXING FILTERING AND CORRECTION OF DOCUMENTS IN SEARCH SYSTEMS," the entire contents of which are hereby expressly incorporated by reference for all purposes.

TECHNICAL FIELD

This disclosure relates generally to computerized search systems. In particular, this disclosure relates to indexing documents for computerized search systems. Even more specifically, this disclosure relates to managing the indexing of documents through detection of the suitability of documents, and alteration of documents, during an indexing process of a search system.

BACKGROUND

A number of different situations commonly arise that require an analysis and identification of certain relevant electronic documents from a relatively large pool of available electronic documents. These situations are generally referred to as search problems. These types of search problems thus crop up in a wide variety of contexts. For example, in litigation, a company's documents may need to be reviewed in order to identify documents that may be relevant to one or more issues in the litigation. In other examples, certain regulatory filings may require review of a number of documents to identify documents that may be relevant to one or more issues in the regulatory filing.

To aid users in resolving these search problems, search engines may be provided in a given electronic context. For example, most people are familiar with generally available Internet or web based search engines such as Google or Microsoft's Bing. Additionally, most computer applications tailored to a particular context may include their own proprietary search engines. In the context of litigation or discovery, for example, many Technology Assisted Review (TAR) applications may include their own search system (also referred to as a search engine).

A search system is a computer program used to index electronically stored information (referred to as the corpus) and search the indexed electronic information to return electronically stored information responsive to a search (also referred to as a query). Items of electronic information that form the corpus may be referred to interchangeably as (electronic) documents, items, files, objects, items, content, etc. and may include objects such as files of almost any type including documents for various editing applications, emails, workflows, etc. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

One commonality between almost all of these search systems, however, is the need to index the files of the corpus in a search index before the files can be searched. For a variety of reasons, the indexing of documents for these types of search systems may be a less the than straightforward process. As but one example of the complexity involved in this indexing, there may be a tradeoff between completeness of the indexing of the documents and the processor cycles, memory usage, size of the index or search time used by the search system using the index.

It would thus be desirable to have improved systems and methods for indexing documents in search systems that increases the completeness of the indexing process while reducing, or not adversely impacting, the processor cycles, memory usage, size of the index or search time used by the search system in the creation or use of the created index.

SUMMARY

As discussed, one commonality between almost all search systems is the need to index the files of the corpus in a search index before the files can be searched. A search index is a body of structured data that a search engine accesses when looking for results that are relevant to a specific query (e.g., instead of processing the actual documents of the corpus when performing a search). A search index usually includes data on certain terms or tokens (e.g., words, numbers, etc.) included in each document and may include other information such as frequency or location of the tokens.

Thus, when a search system indexes a document, the document is usually parsed or otherwise processed to generate a set of tokens from the document. This process is usually referred to as text extraction or the like. The indexing process can then take these tokens and evaluate them to index these generated tokens (or terms, groups of tokens, etc.) by updating the search index with tokens, terms, document identifiers, etc. as needed based on the tokens generated from the text extraction.

In many cases this indexing process may be relatively straightforward, especially in instances where a search system indexes documents of the same format or which were created by the same application. In many other contexts, however, the indexing of documents may be problematic. These problems may result, for example, from the heterogeneity of the documents being indexed, the size of the documents to be indexed or the type of documents to be indexed. A microcosm of these problems exist in search systems that may be utilized for litigation. During discovery documents may be obtained from a large number of custodians and ingested into the search system where it is desired that these document are indexed and available for search and review.

The types of documents ingested into such search systems during the discovery process may encompass an exorbitantly large number of types and sizes of documents, including documents created by a large number of applications or other types of documents, such as source code files, documents containing comma separated values (CSV files), images, audio files, compressed files, password protected files, archive files, etc. The indexing of these documents may thus prove slow or expensive in terms of computer resource. Moreover, the resulting index may prove less useful as there may be large number of extraneous or useless tokens in the index. As but one example, a large CSV file may have millions (or more) individual values or commas where each of the values or commas may be indicated in the index. Thus, the search system that utilizes this type of index may experience a commensurate reduction in speed or efficacy, or an increase in the time it takes to perform a search on the corpus of documents utilizing such an index.

While crude measures have been implemented to filter documents before indexing to remove certain types of documents from an indexing process (e.g., document over a certain size are not indexed), these approaches have had the consequence of also removing useful documents from the indexing process.

What is desired then, are systems and methods that utilize sophisticated and contextually tailored approaches to filtering documents to be indexed, and that have the ability to alter documents to reduce the burden of indexing those documents.

To those ends, among others, embodiments as disclosed provide a search system with an pre-indexing filter that provides both a sophisticated and contextually tailored approach to filtering documents and a corrector that is adapted to alter a document that has been designated to be filtered out from the indexing process and determine if the altered document should be indexed. The alteration of the document may be tied to the attributes, rules or thresholds used to initially filter the document from the indexing process. The filtering criteria (e.g., attributes, rules, thresholds, etc.) can thus be tailored to a specific context (e.g., litigation) such that both the initial filtering and the alteration process may be better suited for application in that context.

In one embodiment, a search system includes an indexer for indexing incoming document (e.g., received document, documents stored in a repository, etc.). The search system may include a filter and a corrector. The document is evaluated by a text extractor and the tokens resulting from performing text extraction on the document are provided to the filter. The filter includes a set of detectors, each detector associated with an attribute or type that may be associated with the document or the token of the document. Each of the tokens of the document is evaluated by the set of detectors to produce a detector score for that detector that is associated with the tokens of the document and that attribute or type.

In a scorer, a set of scoring rules and corresponding rules thresholds can then be used to produce one or more filter scores for the document. In one embodiment, there may be a rule threshold associated with each detector, where the rule threshold is a numerical value. A scoring rule can thus generate a scoring value for the application of the rule to the document based on the rule threshold and the detector score produced by the associated detector. For example, there may be scoring rule associated with a set of detectors where each scoring rule may be binary such that a one is produced if the detector score is above (or below) the rule threshold associated with that detector or a zero if the detector score is below (or above) the rule threshold associated with that detector.

Once the filter scores for the document are generated they can be provided to judger to determine a decision as to whether the document should be indexed based on a set of verdict rules. In one embodiment, these verdict rules may look at each filter score, and if the filter score indicated that a rules threshold has been exceeded (or not reached), the document should not (or should) be indexed. These verdict rules may also be more complex and include, for example, Boolean expressions based on one or more of the filter scores received from the scorer.

If the judger determines that the document should be indexed it may be provided to the indexer of the search system for indexing. If, however, the judger determines the document should not be indexed the document may be instead provided to a corrector. The corrector may attempt to place the document in condition for indexing by altering the document based on the tokens detected by the detectors. Therefore, in one embodiment, the goal of the application of the corrector to the document is thus to remove some or all of the tokens identified by one or more of the detectors. A correction specification of the corrector may specify which type of tokens are to be removed.

The correction specification may, for example, specify that all tokens identified by all the detectors should be removed from the document, that tokens identified by a single or some subset of the detectors should be removed or may specify a progression such that a first set of tokens (e.g., associated with one or more first detectors) should be removed initially and the altered document checked to see if it suitable for indexing after this first set of tokens is removed. If at this point the document is not suitable for indexing the correction specification specifies that a second set of tokens (e.g., associated with one or more second detectors) and the document checked to see if it suitable for indexing after both the first set of tokens and second set of tokens are removed.

Once the document has been altered through the removal of the tokens as specified in the correction specification, the corrector can determine if the document is now suitable for indexing. This determination may be based on one or more suitability criteria or thresholds such as the token count or total size of the corrected document. If the corrector determines that the document should now be indexed the corrected document (or the original document in some instances) may be provided to the indexer of the search system for indexing. If, however, the corrector determines the document should not be indexed the document may not be indexed in the search system or some other action taken such as providing the document (e.g., an identifier of the document or the like) to a human for review.

In one embodiment, therefore, a search system may include a data store, having a corpus and an index of the corpus stored thereon, the corpus comprising a set of documents. The search system may also include a pre-indexer, comprising a filter, a scorer and a corrector. The pre-indexer is adapted to receive a set of tokens for a document from a text extractor before the document is indexed and provide each of the set of tokens to the filter.

The filter may comprise a plurality of detectors, each detector associated with a type of token, and may also include a scorer, and a judger. The filter provides the first set of tokens to each of the plurality of detectors. Each of the detectors can receivie the first set of tokens and determine a second set of tokens of the associated type by determining if each of the received first set of tokens is of the associated type of token. Based on the second set of tokens of the associated type, the detector can determine an associated detector score specific to that detector and the type of token associated with that detector. In a particular embodiment, the detector score for each detector is a ratio of a number of the second set of tokens associated with that detector to a number of the first set of tokens.

A scorer can determine a set of filter scores based on the detector scores produced by each of the plurality of detectors, a set of scoring rules and a rules threshold for each type of token associated with each of the plurality of detectors. A judger can receive the set of filter scores from the scorer and determine if the document should be indexed based on a set of verdict rules including an expression based on one or more of the filter scores. When the judger determines that the document should be indexed, it can forward the document to an indexer wherein the indexer is adapted for indexing the first set of tokens for the document. If the judger determines that the document should not be indexed, it can forward the document to a corrector.

The corrector can alter the document by removing each of the second set of tokens determined by one or more of the detectors from the first set of tokens to create an altered document comprising a third set of tokens and determine if the altered document should be indexed based on a suitability criteria. This suitability criteria can be, for example, document size or a number of the third tokens. When the corrector determines that the altered document should be indexed the corrector can forward the third set of tokens to the indexer for indexing the first document, and when the corrector determines that the altered document should not be indexed it can discard the document.

In some embodiments, each of the plurality of detectors maintains a list of the second set of tokens and altering the document at the corrector comprises accessing, by the corrector, each list of the second set of tokens maintained by each of the plurality of detectors. The corrector may alter the document based on a correction specification specifying one or more types of tokens.

In one embodiment, the correction specification can, for example, specify a progression comprising the one or more types of tokens and associated order and the corrector removes each of the second set of tokens determined by one or more of the detectors from the first set of tokens according to the order determines if the altered document should be indexed based on the suitability criteria after removing each of the one or more types of tokens.

In some embodiments, each of the plurality of detectors maintains a list of the second set of tokens and altering the document at the corrector comprises accessing, by the corrector, each list of the second set of tokens maintained by each of the plurality of detectors. The corrector may alter the document based on a correction specification specifying one or more types of tokens.

Embodiments as presented herein may thus have a number of advantages including allowing a greater number of documents of a given corpus to be indexed while tailoring the indexing of these documents to a given context. Moreover, embodiments may make indexing decisions on particular documents based on the content of the documents themselves. Additionally, embodiments may improve the functioning of computer systems that perform such indexing both from a processing efficiency standpoint, a speed standpoint and a computer resource usage standpoint by removing certain documents from the indexing process, therefore reducing the time of execution of such indexing, the number of compute cycles required for indexing and the memory usage of such indexing.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
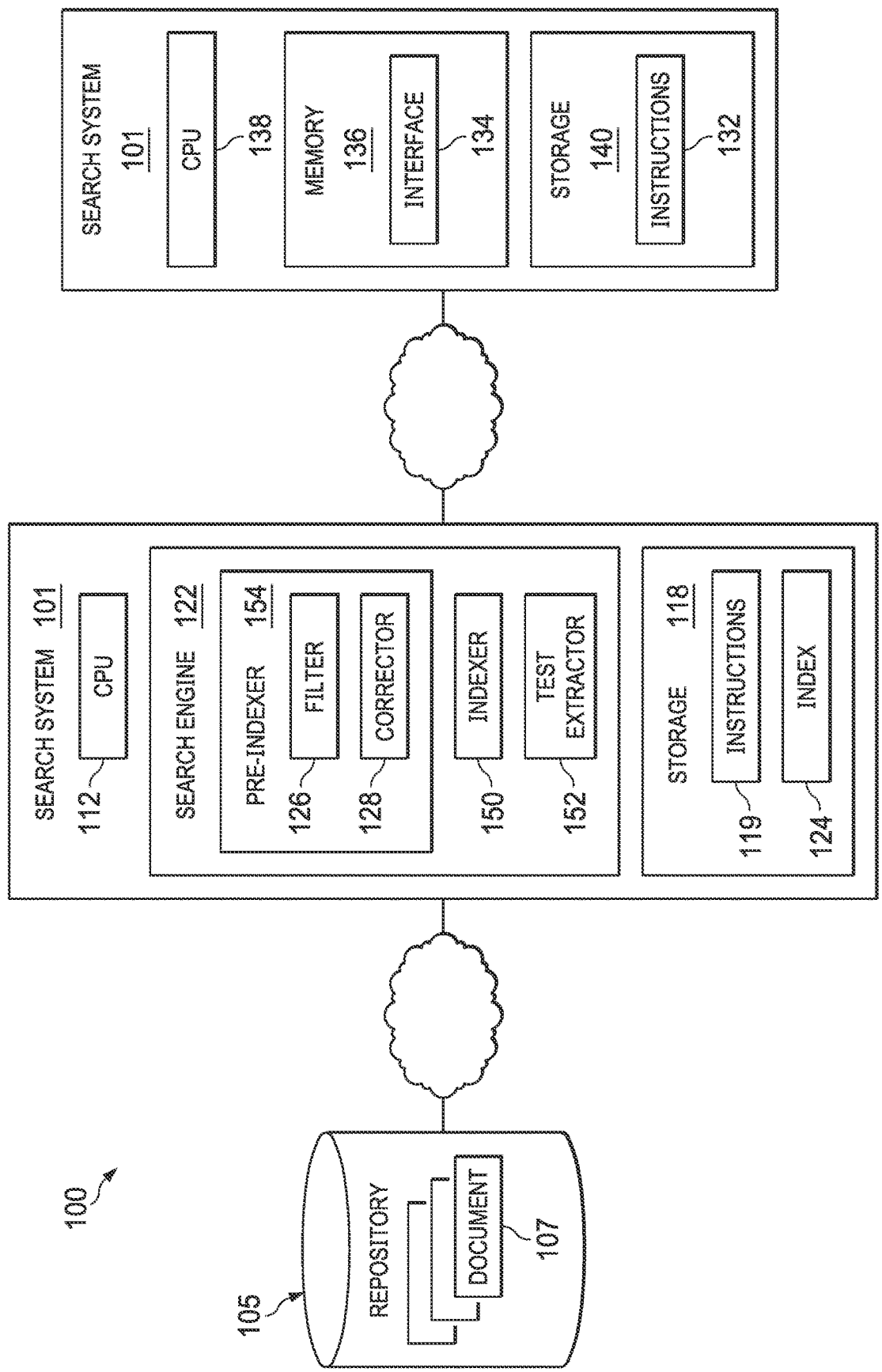
FIG. 1 is a block diagram of one embodiment of an architecture including a search system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around search systems. A search system is a computer program used to index electronically stored information and search the indexed electronic information to return electronically stored information responsive to a search (also referred to as a query). One commonality between search systems is the need to index the documents of the corpus in a search index before the files can be searched. For a variety of reasons, the indexing of documents for these types of search systems may be a less the than straightforward process.

Thus, when a search system indexes a document, the document is usually parsed or otherwise processed to generate a set of tokens from the document. This process is usually referred to as text extraction or the like. The indexing process can then take these tokens and evaluate them to index these generated tokens (or terms, groups of tokens, etc.) by updating the search index with tokens, terms, document identifiers, etc. as needed based on the tokens generated from the text extraction.

In certain contexts the indexing of documents may be problematic. These problems may result, for example, from the heterogeneity of the documents being indexed, the size of the documents to be indexed or the type of documents to be indexed. As an example, these types of problems often occur in search systems that may be utilized for litigation. During discovery documents may be obtained from a large number of custodians and ingested into the search system where it is desired that these document are indexed and available for search and review. The types of documents ingested into such search systems during the discovery process may encompass an exorbitantly large number of types and sizes of documents, including documents created by a large number of applications or other types of documents, such as source code files, documents containing comma separated values (CSV files), images, audio files, compressed files, password protected files, archive files, etc.

The indexing of these documents may thus prove slow or expensive in terms of computer resource. Moreover, the resulting index may prove less useful as there may be large number of extraneous or useless tokens in the index.

To address these issues, among others, embodiments as disclosed provide a search system with an indexing filter that provides both a sophisticated and contextually tailored approach to implementing a pre-indexing filter for documents and a corrector that is adapted to alter a document that has been designated to be filtered out from the indexing process and determine if the altered document should be indexed. The alteration of the document may be tied to the attributes, rules or thresholds used to initially filter the document from the indexing process. The filtering criteria (e.g., attributes, rules, thresholds, etc.) and correction process can thus be tailored to a specific context (e.g., litigation) such that both the initial filtering and the alteration process may be better suited for application in that context.

It will be noted that while certain embodiments as disclosed and discussed herein have been discussed in the context of providing a filter and a corrector in the context of indexing documents, other embodiments may be more generally utilized to provide a pre-processor for any downstream processing system that processes documents based on their content (e.g., the tokens of the documents). Thus, embodiments may generally provide a pre-processor, comprising a filter and a corrector for documents and a corrector that is adapted to alter a document that has been designated to be filtered out from the downstream processing and determine if the altered document should be processed by the downstream processing system. The alteration of the document may be tied to the attributes, rules or thresholds used to initially filter the document. Accordingly, while embodiments will be described with respect to an embodiment in which the downstream processing system is an indexer, these descriptions and embodiments should be taken as exemplary only and it will be understood that other embodiments encompass the use of such pre-processors, filters and correctors in almost any document processing context desired.

Looking then at FIG. 1, a block diagram illustrating an one embodiment of a search system including a pre-indexer is depicted. The search system 101 is part of computing environment 100 including a document repository 105, search system 101, and one or more client computers 130. Document repository 105 may comprise a file server or database system or other storage mechanism remotely or locally accessible by search system 101. Document repository 105 may store documents 107 that may be searchable by search system 101.

In the depicted embodiment search system 101 may include a server or other type of computing device having central processing unit 112 connected to a memory and a data store storage 118 (e.g., via a bus). Central processing unit 112 may represent a single processor, multiple processors, a processor(s) with multiple processing cores and the like. Data store 118 may include a non-transitory storage medium such as hard disk drives, flash memory devices, optical media or the like. Search system 101 may be connected to a data communications network such as the Internet, a local area network (LAN), a wide area network (WAN), a cellular network or some other network or combination of networks.

Data store 118 stores computer executable instructions 119 and index 124. Computer executable instructions 119 can represent one or more multiple programs or operating system instructions. In one embodiment, instructions 119 are executable to provide search engine 122. Search engine 122 may be, for example, a program that interfaces or is part of a document review or content management system (not shown). In such cases, the search engine 122 may be implemented on the same computing systems or can be distributed across multiple computing systems or platforms. It will be noted here that while embodiments described and depicted with respect to FIG. 1 include a deployment of a search system on a physical computing device other embodiments may include the search system deployed as a service on, for example, a cloud computing environment or otherwise deployed without loss of generality.

Index 124 may include data used to identify documents in response to a search query received by the search engine 122. The index, may, for example, include text or the other data used to identify documents 107. For example, an index 124 may be an inverted index including a set of tokens along with an identification of which documents 107. Other arrangements or types of indexes 124 may be utilized and are fully contemplated herein. Moreover, while shown as a single index, index 124 may include multiple indices. Further, index 124 may be partitioned, with different documents 107 being represented in each partition.

Thus, search engine 122 may include an indexer 150 for processing documents 107 to add the document 107 to the index 124, where adding a document 107 to the index 124 comprises updating the search index with tokens or document identifiers determined from the document 107 to the index 124. The indexer 150 therefore includes a text extractor 152 for extracting tokens from a document 107.

The search engine 122 may also include a pre-indexer 154 that sits logically between the text extractor 152 and the indexer 150. The pre-indexer 154 includes a filter 126 and a corrector 128. The filter 126 is adapted to act as a pre-indexing screener for providing an indication of whether a document 107 should be indexed by the indexer 124 based on the tokens extracted for the document 107 while the corrector 128 is adapted to alter a document that has been designated to be filtered out from the indexing process by the filter 126 and determine if the altered document should be indexed.

Client computer system 130 may include components similar to those of the server of search system 101, such as CPU 138 and data store 140. Additionally, client computer system 130 may include executable instructions 132 to provide user interface 134 that allows a user to enter a search query. These instructions 132 may have, for example, been provided by search system 101 in response to an access by client computer 130. For example, user interface 134 may be provided through a web browser, file system interface or other method without loss of generality.

Again, those skilled in the art will appreciate that search system 101 shown in FIG. 1 is merely an example of a computing system and embodiments of a search system that may be implemented using other computing systems (e.g., desktop computers, laptops, mobile computing devices, services platforms, cloud computing platforms or other computing devices or platforms with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, when a document 107 is added to the search system 101, or when documents 107 are processed in a batch format, a document 107 is provided to text extractor 152 that parses or analyzes the document 107 to determine a set of tokens for the document 107 and provides the set of tokens for the document 107 to the pre-indexer 154. The pre-indexer 154 first passes the tokens through filter 126, which is adapted to provide an indication of whether a document 107 should be indexed by the indexer 150 in index 124 based on the tokens extracted for the document 107.

In one embodiment, the filter 126 includes a set of detectors, each detector associated with an attribute or type that may be associated with the document or the tokens of the document. Each of the tokens of the document 107 is evaluated by the set of detectors to produce a detector score for that detector that is associated with the tokens of the document. The filter 126 includes a set of scoring rules and corresponding rules thresholds that can be used by the filter 126 to produce one or more filter scores for the document. In one embodiment, there may be a rule threshold associated with a set of detectors of the filter 126, where the rule threshold is a numerical value. A scoring rule can thus generate a scoring value for the application of the rule to the document 107 based on the rule threshold and the detector score produced by the associated detector. Once the filter scores for the document 107 are generated they can be evaluated by the filter 126 to determiner a decision as to whether the document should be indexed. If the filter 126 determines that the document 107 should be indexed, an indexing indication (or the tokens of the document 107, document 107, a location of the document 107 in repository 105, an identifier of the document, etc.) can be provided by the pre-indexer 154 to the indexer 150. Indexer 150 can then send indexing instructions to storage 118 to add, modify, or delete data in index 124 to index the document 107.

If, however, the filter 126 determines the document should not be indexed the filter 126 may provide a no-index indication to the pre-indexer 154. When the no-index indicator is received by the pre-indexer 154, the pre-indexer 154 can move to the next document 107 (e.g., without sending providing the document 107 to the indexer 150) or can provide the document 107 (e.g., or the tokens of the document 107, document 107, a location of the document 107 in repository 105, an identifier of the document, etc.) to corrector 128. The corrector 128 may attempt to place the document 107 in condition for indexing by altering the document 107 based on the tokens detected by the detectors of the filter 126. Therefore, in one embodiment, the corrector 128 removes some or all of the tokens identified by one or more of the detectors of the filter 126 as specified by a correction specification. The correction specification may, for example, specify that all tokens identified by all the detectors should be removed from the document, that tokens identified by a single or some subset of the detectors should be removed or may specify a progression such that a first set of tokens (e.g., associated with one or more first detectors) should be removed initially and the document checked to see if it suitable for indexing after this first set of tokens is removed.

The corrector 128 may alter the document 107 by obtaining the document 107 from the repository 105 and storing a local copy of the document 107. For each type of tokens the correction specification has designated for removal, the corrector 128 may determine that set of tokens, remove that set of tokens and save the altered document in the local copy of the document 107. To make such a determination, in one embodiment the corrector 128 may access a list of the tokens of a particular type as determined by an associated detector when evaluating the set of tokens of the document 107. These tokens can then be removed from the local copy of the document 107.

Once the document has been altered through the removal of the tokens as specified in the correction specification, the corrector 128 can determine if the document is now suitable for indexing. This determination may be based on one or more suitability criteria or thresholds such as the token count or total size of the altered document (e.g., the altered locally stored copy of the document 107). In one embodiment, corrector 128 may be able to determine if an altered document would meet such suitability criteria after alteration based on the correction specification without actually creating an altered document (e.g., without altering a locally stored copy of the document 107). For example, if corrector 128 can access a list of the tokens of a particular type that may be determined by a detector when evaluating the set of tokens of the document 107, it may be possible to determine a token count or total size of an altered document without actually altering the document 107 by taking a difference between the token count or total size of the (original) document 107 and the count or size of the tokens in the list of tokens determined by the detector.

If corrector 128 determines that the document should now be indexed, an indexing indication and the altered document 107 (or the original document 107, the tokens of the altered or original document 107, a location of the altered document in memory or original document 107 in repository 105, etc.) can be provided by the pre-indexer 154 to the indexer 150. Indexer 150 can then send indexing instructions to storage 118 to add, modify, or delete data in index 124 to index the document 107. If, however, the corrector 128 determines the document should not be indexed the document may not be indexed or some other action taken such as providing the document (e.g., an identifier of the document or the like) to a human for review.

Figure 2:
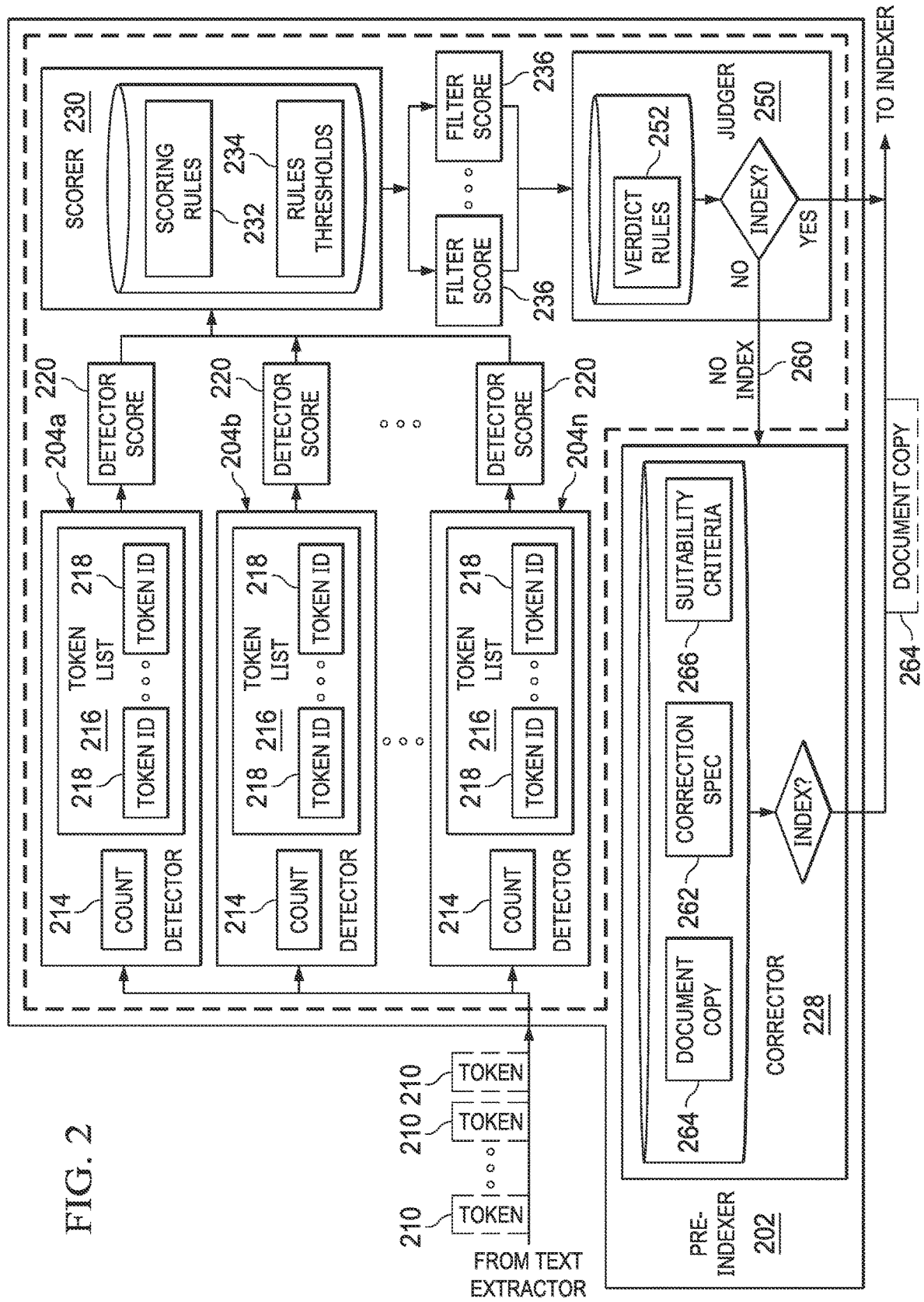
FIG. 2 is a block diagram of one embodiment of a pre-indexer for use in a search system.

A more detailed depiction of one embodiment of a pre-indexer is depicted in FIG. 2. As discussed above, pre-indexer 202 sits logically between a text-extractor and an indexer of a search system (or more generally, any other system that may utilize an indexer or otherwise perform document analysis based on the tokens of a document). The pre-indexer 202 includes a filter 226 and a corrector 228. The filter 226 is adapted to act as a pre-indexing screener for providing an indication of whether a document should be indexed by an indexer based on the tokens extracted for the document while the corrector 228 is adapted to alter a document that has been designated to be filtered out from the indexing process by the filter 226 and determine if the altered document should be indexed.

In one embodiment, then, as tokens 210 of a document are received from a text extractor, they are provided to pre-indexer 202 which provides the tokens 210 to the filter 226. Filter 226 includes a set of detectors 204, each detector 204 associated with an attribute or type that may be associated with the document or a token of the document. The tokens 210 of the document are evaluated by the set of detectors 204 to produce a detector score 212 that is associated with the tokens 210 of a document and the attribute or type associated with that detector 204. For example, detector 204a can produce detector score 212a, detector 204b can produce detector score 212c, detector 204n can produce detector score 212n, etc.

Thus, as tokens 210 are received at the filter 226, each token 210 is provided to each of the detectors 204. Each detector 204 may evaluate the token 210 and determine if the token 210 is of the type (or associated with the attribute) for which the detector 204 is configured. If the detector 204 determines the token 210 is of the associated type it can increment a count 214 for the document for that type of token. In other words, the detector 204 may determine the token 210 is of a particular type associated with that detector 204 and increment the count 214 to track how many of that type of token 210 are present in the document being evaluated. The detector score 212 produced by a detector 204 can thus be based on the count 214 of the particular type of token 210 determined by that detector 210. As but one example, the detector score 212 produced by a detector 204 may be a ratio of the count of tokens 210 of the particular type associated with the detector 210 to the total number of tokens 210 of a document.

In some embodiments, the detector 204 may also keep a list 216 of the tokens 210 that the detector 204 has determined is of the associated type. Thus, when the detector 204 determines that a token 210 is of the associated type a token identifier 218 for the token can be added to the token list 216 maintained by that detector 204. For example, the token 210 itself may be added to the list as the token identifier 218, or another type of identifier of the token such as a location or position within the document or the set of tokens may be added to the list as the token identifier 218.

Detectors 204 may be associated with almost any type of token 210 desired. Some types of tokens 210 that may be determined by detectors 204 are, for instance, any token (e.g., which may a count of the total number of tokens of the document), math tokens, punctuation tokens, unique or entropic tokens, tokens encoded in a certain manner (e.g., base64 encoding), or gibberish tokens. One particular detector 204 may count the (e.g., total) number of tokens received, such that the detector score 220 for that detector 204 may just be the total number of tokens 210 of the document.

As another example, a math detector 204 may receive a token 210 and determine if it is a number (e.g., by determining if it is a number or attempting to convert the token to a number). If the token 210 is determined to be a number the math detector 204 may increment the count 214. The detector score 220 produced by a math detector 204 may be a ratio of the count 214 of number tokens to the overall number of tokens of the document.

A punctuation detector 204 may receive a token 210 and determine if it is a punctuation token (e.g., by comparing the token 210 to a punctuation dictionary to determine if it matches any punctuation mark). If the token 210 is determined to be a punctuation the punctuation detector 204 may increment the count 214. The detector score 220 produced by a punctuation detector 204 may be a ratio of the count 214 of punctuation tokens to the overall number of tokens of the document.

Another type of detector 204 may be an entropy detector 204. An entropy detector 204 may receive a token 210 and determine if it is a unique token (e.g., by comparing the token to the list 214 of received tokens that have been previously identified). If the token 210 is determined to be a unique the entropy detector 204 may increment the count 214. The detector score 220 produced by an entropy detector 204 may be a ratio of the count 214 of unique tokens to the overall number of tokens of the document.

A gibberish detector 204 may receive a token 210 and determine if it is a "gibberish" token 210 such as a character that tends to be included in corrupted or password protected documents, certain print characters, etc. (e.g., by comparing the token 210 to a dictionary of previously identified "gibberish" tokens). If the token 210 is determined to be gibberish (e.g., is in the dictionary) the detector 204 may increment the count 214. The detector score 220 produced by an gibberish detector 204 may be a ratio of the count 214 of gibberish tokens to the overall number of tokens of the document.

Still another type of detector 204 may be an encoding detector 204. An encoding detector 204 may receive a token 210 and determine if the token 210 is encoded according to a certain scheme (e.g., a base64 or another type of encoding scheme). If the token 210 is determined to be encoded in that scheme the encoding detector 204 may increment the count 214. The detector score 220 produced by an encoding detector 204 may be a ratio of the count 214 of tokens encoded in that scheme to the overall number of tokens of the document.

Accordingly, once all the tokens 210 have been received by the filter 226 and processed by the set of detectors 204, each detector 204 can output its associated detector score 220 to scorer 230 of filter 226. Scorer 230 is configured with a set of scoring rules 232 and associated rules thresholds 234. In one embodiment, there may be a rules threshold 234 associated with each of the detectors 204, where the rules threshold 234 may indicate a maximum or minimum value for the detector score 220 produced by the associated detector 204. There may also be rules thresholds 234 associated with other attributes or data about the document such as a file size (e.g., a maximum or minimum file size for a document).

Scoring rules 232 may be an expression for comparing or relating one or more detector scores 220 or counts 214 from the detectors 204 to one or more rules thresholds 234 and a definition for producing a filter score 236 based on the results of the comparison or relation. A scoring rule 232 can thus generate a filter score 236 for the application of the rule 232 to the document based on the rules thresholds 234 and the detector score 220 produced by one or more detectors. A scoring rule 232 may also be used to generate a filter score 236 based on one or more other attributes or data about a document (e.g., a file size of a document). In one embodiment, there may be a scoring rule 232 associated with each detector 204 where each scoring rule 232 may be binary such that a one (or zero or other indicator) is produced if the detector score 220 is above (or below) a rule threshold 234 associated with that detector 204, or a zero (or one or other indicator) if the detector score 220 is below (or above) the rule threshold 234 associated with that detector 204. Additionally, there may be a binary scoring rule 232 based on one or more other attributes or data about a document (e.g., a file size of a document) such that a one (or zero or other indicator) is produced if the attribute or data is above (or below) a rule threshold 234 associated with that attribute, or a zero (or one or other indicator) if the attribute is below (or above) the rule threshold 234 associated with that attribute. As the values of the rules threshold 234 may be tailored to a particular domain or context the filter scores 236 produced by the scoring rules 232 may likewise reflect the context or domain of the documents being indexed, or the context or domain in which a search system employing the pre-indexer is being utilized (e.g., may allow more or fewer documents, or more or fewer of certain types of documents, to be indexed in particular contexts or domains).

In one embodiment, for example, tailored for a litigation environment a rules threshold 234 for a math detector 204 that produces a detector score 220 that is a ratio of the count of number tokens to the overall number of tokens of the document may be 0.45. A rules threshold 234 for a punctuation detector 204 that produces a detector score 220 that is a ratio of the count 214 of punctuation tokens to the overall number of tokens of the document may be 0.55. Another rules threshold for an entropy detector 204 that produces a detector score 220 that is a ratio of the count of unique tokens to the overall number of tokens of the document may be 0.8. Still another rules threshold for an encoding detector 204 that produces a detector score 220 that is a ratio of tokens 210 encoded in a certain scheme (e.g., base64) to the overall number of tokens of the document may be 0.7 m while a rules threshold for a gibberish detector 204 that produces a detector score 220 that is a ratio of the count of defined gibberish tokens to the overall number of tokens of the document may be 0.01.

Accordingly, once the filter scores 236 for the document are generated they can be evaluated by the judger 250 to determine a verdict as to whether the document should be indexed. The filter scores 236 may be evaluated based on a set of verdict rules 252 which may be rules having an expression and an action. The expression may be a Boolean expression based on the filter scores 236 determined by the scorer 230. In one embodiment, the verdict rules 252 may indicate that if any of the filter scores 236 is an indication that (e.g., one or zero or other indicator) that a rule threshold 234 associated with a detector 204 is exceeded the document should be assigned one or more labels or flags (used here interchangeably) indicating the rules threshold 234 has been exceeded and the document should not be indexed.

Based on the application of the verdict rules 252, the judger 250 can determine if the document should be indexed. For example, if any label is assigned to the document indicating a rules threshold 234 has been exceeded the judger 250 may determine that the document should not be indexed while if no such labels are assigned to the document the judger 250 may determine that the document should be indexed. In the latter instance, an indexing indication (or the tokens of the document, document itself, a location of the document, an identifier of the document, etc.) can be provided by the to the indexer of the search system.

An example of pseudocode for one embodiment of generating filter scores through scoring rules and applying verdict rules to determine one or more verdicts about a document is as follows, where file_sz is the size of a document, u_v_w is a detector score produced by an entropy detector, w_cnt is a count of the number of tokens of a document, p_v_w, is a detector score produced by a punctuation detector, n_v_u is a detector score produced by a number detector, n_cnt is a count of the number tokens (e.g., as determined by the number detector), g_v_u is a detector score produced by a gibberish detector, g_cnt is a count of the gibberish tokens (e.g., as determined by the gibberish detector) and b_v_u is a detector score produced by an encoder detector. The various rules thresholds may be GENEROUS_FILE_SIZE, MAX_FILE_SIZE, MIN_FILE_SIZE, MAX_ENTROPY_RATIO, MIN_TINY, MAX_PUNCHY_RATIO, MAX_MATHY_RATIO, MAX_GIB_RATIO, MAX_B64_RATIO, etc.

Notice here that an index indicator (e.g. "OK") may be determined for a document unless another type of verdict is determined (e.g., LONG, NOISY, etc.). Notice as well that according to this embodiment, NOISY are documents that have their extracted text size larger certain threshold, but smaller than the absolute maximum threshold and that the last verdict is GENEROUS, which can be assigned if NOISY documents do not have any other verdict (e.g., except for OK) assigned and the detector scores are not higher than the associated thresholds. In this case, the document may be classified as GENEROUS which, in some cases, may be an index indicator.

```
verdict="OK"
if file_sz>GENEROUS_FILE_SIZE:
    verdict="LONG"
    report(verdict)
if GENEROUS_FILE_SIZE>file_sz>MAX_FILE_SIZE:
    verdict="NOISY"
    report(verdict)
if file_sz>=MIN_FILE_SIZE:
    if     (u_v_w>=MAX_ENTROPY_RATIO)    and
        (w_cnt>=MIN_TINY):
        verdict="ENTROPIC"
        report(verdict)
    if     (p_v_w>=MAX_PUNCHY_RATIO)    and
        (w_cnt>=MIN_TINY):
        verdict="PUNCHY"
        report(verdict)
    if     (n_v_u>=MAX_MATHY_RATIO)    and
        (n_cnt>=MIN_TINY):
        verdict="MATHY"
        report(verdict)
    if     (g_v_u>=MAX_GIB_RATIO)    and
        (g_cnt>=MIN_GIB):
        verdict="GIBBERISH"
        report(verdict)
    if     (b_v_u>=MAX_B64_RATIO)    and
        (p_v_w>=MAX_PUNCHY_RATIO):
        verdict="BASEY"
        report(verdict)
    if     (g_v_u<MAX_GIB_RATIO)    and
        (b_v_u<MAX_B64_RATIO) and \
        (p_v_w<MAX_PUNCHY_RATIO)    and
        (n_v_u<MAX_MATHY_RATIO) and \
        (u_v_w<MAX_ENTROPY_RATIO) and \
        (GENEROUS_FILE_SIZE>file_sz>MAX_FILE_SIZE):
        verdict="GENEROUS"
```

If the judger 250 determines that the document should not be indexed, determines the document should not be indexed the filter 126, a no-index indication 260 may be provided to corrector 228. The no-index indication 260 may also include, or be provided with, a reference to the document (e.g., the tokens of the document, the document itself, a location of the document, an identifier of the document, etc.). The corrector 228 may attempt to place the document in condition for indexing by altering the document based on the tokens detected by the detectors 204 and correction specification 262. Therefore, in one embodiment, the corrector 228 removes some or all of the tokens identified by one or more of the detectors 204 as specified by the correction specification 262. The correction specification 262 may, for example, specify that all tokens identified by all the detectors 204 should be removed from the document, that tokens identified by a single or some subset of the detectors 204 should be removed or may specify a progression such that a first set of tokens (e.g., associated with one or more first detectors 204) should be removed initially and the document checked to see if it suitable for indexing after this first set of tokens is removed.

The corrector 228 may alter the document by obtaining the document from the repository and storing a local copy 264 of the document. For each type of tokens 210 the correction specification 262 has designated for removal, the corrector 228 may determine that set of tokens 210, remove that set of tokens 210 and save the altered document in the local copy 264 of the document. To make such a determination, in one embodiment the corrector 228 may access the list 216 of the tokens of a particular type as determined by an associated detector 204 when evaluating the set of tokens 210 of the document. These tokens 210 as maintained in the list 216 can then be removed from the local copy 264 of the document.

Once the document has been altered through the removal of the tokens as specified in the correction specification 262, the corrector 228 can determine if the document is now suitable for indexing. This determination may be based on one or more suitability criteria or thresholds 266 such as the token count or total size of the altered document (e.g., the altered locally stored copy 264). In one embodiment, corrector 228 may be able to determine if an altered document would meet such suitability criteria after alteration based on the correction specification 262 without actually creating an altered document (e.g., without altering a locally stored copy 264). For example, if corrector 228 can access list 216 of the tokens 210 of a particular type that may be determined by a detector 204 when evaluating the set of tokens 210 of the document, it may be possible to determine a token count or total size of an altered document without actually altering the document by taking a difference between the token count or total size of the (original) document and the count or size of the tokens in the list of tokens determined by the detector.

If corrector 228 determines that the document should now be indexed, the document, the altered document 264 (or the original document, the tokens of the altered or original document, a location of the altered document in memory or original document in a repository, etc.) can be provided to the indexer. If, however, the corrector 228 determines the document should not be indexed the document may not be indexed or some other action taken such as providing the document (e.g., an identifier of the document or the like) to a human for review.

It may now be useful to an understanding of particular embodiments with respect to a particular example. Here, an embodiment as disclosed is applied to the article "Bitcoin: A Peer-to-Peer Electronic Cash System" by Satoshi Nakamoto, hereby incorporated herein by reference in its entirety. For this example, the MAX_FILE_SIZE was configured at 20000 bytes. When this document is passed through a text extractor the following tokens may result:

<pre style="white-space: pre-wrap;">
Bitcoin: A Peer-to-Peer Electronic Cash System
Satoshi Nakamoto
satoshin@gmx.com
www.bitcoin.org
Abstract. A purely peer-to-peer version of electronic cash would allow online payments to be sent directly from one party to another without going through a financial institution. Digital signatures provide part of the solution, but the main benefits are lost if a trusted third party is still required to prevent double-spending. We propose a solution to the double-spending problem using a peer-to-peer network. The network timestamps transactions by hashing them into an ongoing chain of hash-based proof-of-work, forming a record that cannot be changed without redoing the proof-of-work. The longest chain not only serves as proof of the sequence of events witnessed, but proof that it came from the largest pool of CPU power. As long as a majority of CPU power is controlled by nodes that are not cooperating to attack the network, they'll generate the longest chain and outpace attackers. The network itself requires minimal structure. Messages are broadcast on a best effort basis, and nodes can leave and rejoin the network at will, accepting the longest proof-of-work chain as proof of what happened while they were gone.

1. INTRODUCTION

Commerce on the Internet has come to rely almost exclusively on financial institutions serving as trusted third parties to process electronic payments. While the system works well enough for most transactions, it still suffers from the inherent weaknesses of the trust based model. Completely non-reversible transactions are not really possible, since financial institutions cannot avoid mediating disputes. The cost of mediation increases transaction costs, limiting the minimum practical transaction size and cutting off the possibility for small casual transactions, and there is a broader cost in the loss of ability to make non-reversible payments for non-reversible services. With the possibility of reversal, the need for trust spreads. Merchants must be wary of their customers, hassling them for more information than they would otherwise need. A certain percentage of fraud is accepted as unavoidable. These costs and payment uncertainties can be avoided in person by using physical currency, but no mechanism exists to make payments over a communications channel without a trusted party. What is needed is an electronic payment system based on cryptographic proof instead of trust, allowing any two willing parties to transact directly with each other without the need for a trusted third party. Transactions that are computationally impractical to reverse would protect sellers from fraud, and routine escrow mechanisms could easily be implemented to protect buyers. In this paper, we propose a solution to the double-spending problem using a peer-to-peer distributed timestamp server to generate computational proof of the chronological order of transactions. The system is secure as long as honest nodes collectively control more CPU power than any cooperating group of attacker nodes.
1.

2. TRANSACTIONS

We define an electronic coin as a chain of digital signatures. Each owner transfers the coin to the next by digitally signing a hash of the previous transaction and the public key of the next owner and adding these to the end of the coin. A payee can verify the signatures to verify the chain of ownership.
Transaction
Owner 1's
Public Key
Transaction
Owner 2's
Public Key
Transaction
Owner 3's
Public Key
Hash
Owner 0's
Signature
Owner 1's
Private Key
Verify
Sign
Hash
Owner 1's
Signature
Owner 2's
Private Key
Verify
Sign
Hash
</pre>

Owner 2's
Signature
Owner 3's
Private Key

The problem of course is the payee can't verify that one of the owners did not double-spend the coin. A common solution is to introduce a trusted central authority, or mint, that checks every transaction for double spending. After each transaction, the coin must be returned to the mint to issue a new coin, and only coins issued directly from the mint are trusted not to be double-spent. The problem with this solution is that the fate of the entire money system depends on the company running the mint, with every transaction having to go through them, just like a bank. We need a way for the payee to know that the previous owners did not sign any earlier transactions. For our purposes, the earliest transaction is the one that counts, so we don't care about later attempts to double-spend. The only way to confirm the absence of a transaction is to be aware of all transactions. In the mint based model, the mint was aware of all transactions and decided which arrived first. To accomplish this without a trusted party, transactions must be publicly announced [1], and we need a system for participants to agree on a single history of the order in which they were received. The payee needs proof that at the time of each transaction, the majority of nodes agreed it was the first received.

3. TIMESTAMP SERVER

The solution we propose begins with a timestamp server. A timestamp server works by taking a hash of a block of items to be timestamped and widely publishing the hash, such as in a newspaperorUsenetpost[2-5].

The timestamp proves that the data must have existed at the time, obviously, in order to get into the hash. Each timestamp includes the previous timestamp in its hash, forming a chain, with each additional timestamp reinforcing the ones before it.

Hash
Block
Item Item . . .
Hash
Block
Item Item . . .

4. PROOF-OF-WORK

To implement a distributed timestamp server on a peer-to-peer basis, we will need to use a proof-of-work system similar to Adam Back's Hashcash [6], rather than newspaper or Usenet posts. The proof-of-work involves scanning for a value that when hashed, such as with SHA-256, the hash begins with a number of zero bits. The average work required is exponential in the number of zero bits required and can be verified by executing a single hash.

For our timestamp network, we implement the proof-of-work by incrementing a nonce in the block until a value is found that gives the block's hash the required zero bits. Once the CPU effort has been expended to make it satisfy the proof-of-work, the block cannot be changed without redoing the work. As later blocks are chained after it, the work to change the block would include redoing all the blocks after it.

Block
Prev Hash Nonce
Tx Tx . . .

Block
Prev Hash Nonce
Tx Tx . . .

The proof-of-work also solves the problem of determining representation in majority decision making. If the majority were based on one-IP-address-one-vote, it could be subverted by anyone able to allocate many IPs. Proof-of-work is essentially one-CPU-one-vote. The majority decision is represented by the longest chain, which has the greatest proof-of-work effort invested in it. If a majority of CPU power is controlled by honest nodes, the honest chain will grow the fastest and outpace any competing chains. To modify a past block, an attacker would have to redo the proof-of-work of the block and all blocks after it and then catch up with and surpass the work of the honest nodes. We will show later that the probability of a slower attacker catching up diminishes exponentially as subsequent blocks are added.

To compensate for increasing hardware speed and varying interest in running nodes over time, the proof-of-work difficulty is determined by a moving average targeting an average number of blocks per hour. If they're generated too fast, the difficulty increases.

5. NETWORK

The steps to run the network are as follows:
1) New transactions are broadcast to all nodes.
2) Each node collects new transactions into a block.
3) Each node works on finding a difficult proof-of-work for its block.
4) When a node finds a proof-of-work, it broadcasts the block to all nodes.
5) Nodes accept the block only if all transactions in it are valid and not already spent.
6) Nodes express their acceptance of the block by working on creating the next block in the chain, using the hash of the accepted block as the previous hash.

Nodes always consider the longest chain to be the correct one and will keep working on extending it. If two nodes broadcast different versions of the next block simultaneously, some nodes may receive one or the other first. In that case, they work on the first one they received, but save the other branch in case it becomes longer. The tie will be broken when the next proof-of-work is found and one branch becomes longer; the nodes that were working on the other branch will then switch to the longer one.
3
New transaction broadcasts do not necessarily need to reach all nodes. As long as they reach many nodes, they will get into a block before long. Block broadcasts are also tolerant of dropped messages. If a node does not receive a block, it will request it when it receives the next block and realizes it missed one.

6. INCENTIVE

By convention, the first transaction in a block is a special transaction that starts a new coin owned by the creator of the block. This adds an incentive for nodes to support the network, and provides a way to initially distribute coins into circulation, since there is no central authority to issue them. The steady addition of a constant of amount of new coins is analogous to gold miners expending resources to add gold to circulation. In our case, it is CPU time and electricity that is expended. The incentive can also be funded with transaction fees. If the output value of a transaction is less than its input value, the difference is a transaction fee that is added to the incentive value of the block containing the transaction. Once a predetermined number of coins have entered circulation, the incentive can transition entirely to transaction fees and be completely inflation free.

The incentive may help encourage nodes to stay honest. If a greedy attacker is able to assemble more CPU power than all the honest nodes, he would have to choose between using it to defraud people by stealing back his payments, or using it to generate new coins. He ought to find it more profitable to play by the rules, such rules that favour him with more new coins than everyone else combined, than to undermine the system and the validity of his own wealth.

7. RECLAIMING DISK SPACE

Once the latest transaction in a coin is buried under enough blocks, the spent transactions before it can be discarded to save disk space. To facilitate this without breaking the block's hash, transactions are hashed in a Merkle Tree [7][2][5], with only the root included in the block's hash. Old blocks can then be compacted by stubbing off branches of the tree. The interior hashes do not need to be stored.
  Block
  Block Header (Block Hash)
  Prev Hash Nonce
  Root Hash
  Block
  Block Header (Block Hash)
  Prev Hash Nonce
  Root Hash
  Hash01 Hash23 Hash01 Hash23
  Hash0 Hash1 Hash2 Hash3 Hash2 Hash3
  Tx0 Tx1 Tx2 Tx3 Tx3
  Transactions Hashed in a Merkle Tree After Pruning Tx0-2 from the Block A block header with no transactions would be about 80 bytes. If we suppose blocks are generated every 10 minutes, 80 bytes*6*24*365=4.2 MB per year. With computer systems typically selling with 2 GB of RAM as of 2008, and Moore's Law predicting current growth of 1.2 GB per year, storage should not be a problem even if the block headers must be kept in memory.
  4

8. SIMPLIFIED PAYMENT VERIFICATION

It is possible to verify payments without running a full network node. A user only needs to keep a copy of the block headers of the longest proof-of-work chain, which he can get by querying network nodes until he's convinced he has the longest chain, and obtain the Merkle branch linking the transaction to the block it's timestamped in. He can't check the transaction for himself, but by linking it to a place in the chain, he can see that a network node has accepted it, and blocks added after it further confirm the network has accepted it.
  Longest Proof-of-Work Chain
  Block Header
  Prev Hash Nonce
  Merkle Root
  Block Header
  Prev Hash Nonce
  Merkle Root
  Block Header
  Prev Hash Nonce
  Merkle Root
  Hash01 Hash23
  Merkle Branch for Tx3
  Hash2 Hash3
  Tx3

As such, the verification is reliable as long as honest nodes control the network, but is more vulnerable if the network is overpowered by an attacker. While network nodes can verify transactions for themselves, the simplified method can be fooled by an attacker's fabricated transactions for as long as the attacker can continue to overpower the network. One strategy to protect against this would be to accept alerts from network nodes when they detect an invalid block, prompting the user's software to download the full block and alerted transactions to confirm the inconsistency. Businesses that receive frequent payments will probably still want to run their own nodes for more independent security and quicker verification.

9. COMBINING AND SPLITTING VALUE

Although it would be possible to handle coins individually, it would be unwieldy to make a separate transaction for every cent in a transfer. To allow value to be split and combined, transactions contain multiple inputs and outputs. Normally there will be either a single input from a larger previous transaction or multiple inputs combining smaller amounts, and at most two outputs: one for the payment, and one returning the change, if any, back to the sender.
  Transaction
  In Out
  In . . .
  . . .

It should be noted that fan-out, where a transaction depends on several transactions, and those transactions depend on many more, is not a problem here. There is never the need to extract a complete standalone copy of a transaction's history.
  5

10. PRIVACY

The traditional banking model achieves a level of privacy by limiting access to information to the parties involved and the trusted third party. The necessity to announce all transactions publicly precludes this method, but privacy can still be maintained by breaking the flow of information in another place: by keeping public keys anonymous. The public can see that someone is sending an amount to someone else, but without information linking the transaction to anyone. This is similar to the level of information released by stock exchanges, where the time and size of individual trades, the "tape", is made public, but without telling who the parties were.
  Traditional Privacy Model
  Identities Transactions Trusted
  Third Party
  Counterparty Public
  New Privacy Model
  Identities Transactions Public As an additional firewall, a new key pair should be used for each transaction to keep them from being linked to a common owner. Some linking is still unavoidable with multi-input transactions, which necessarily reveal that their inputs were owned by the same owner. The risk is that if the

11. CALCULATIONS

We consider the scenario of an attacker trying to generate an alternate chain faster than the honest chain. Even if this is accomplished, it does not throw the system open to arbitrary changes, such as creating value out of thin air or taking money that never belonged to the attacker. Nodes are not going to accept an invalid transaction as payment, and honest nodes will never accept a block containing them. An attacker can only try to change one of his own transactions to take back money he recently spent. The race between the honest chain and an attacker chain can be characterized as a Binomial Random Walk. The success event is the honest chain being extended by one block, increasing its lead by +1, and the failure event is the attacker's chain being extended by one block, reducing the gap by −1. The probability of an attacker catching up from a given deficit is analogous to a Gambler's Ruin problem. Suppose a gambler with unlimited credit starts at a deficit and plays potentially an infinite number of trials to try to reach breakeven. We can calculate the probability he ever reaches breakeven, or that an attacker ever catches up with the honest chain, as follows [8]:

p = probability an honest node finds the next block
q = probability the attacker finds the next block
$q_z$ = probability the attacker will ever catch up from z blocks behind $$q_z = \begin{cases} 1 & \text{if } p \leq q \\ (q/p)^z & \text{if } p > q \end{cases}$$

Given our assumption that p > q, the probability drops exponentially as the number of blocks the attacker has to catch up with increases. With the odds against him, if he doesn't make a lucky lunge forward early on, his chances become vanishingly small as he falls further behind. We now consider how long the recipient of a new transaction needs to wait before being sufficiently certain the sender can't change the transaction. We assume the sender is an attacker who wants to make the recipient believe he paid him for a while, then switch it to pay back to himself after some time has passed. The receiver will be alerted when that happens, but the sender hopes it will be too late. The receiver generates a new key pair and gives the public key to the sender shortly before signing. This prevents the sender from preparing a chain of blocks ahead of time by working on it continuously until he is lucky enough to get far enough ahead, then executing the transaction at that moment. Once the transaction is sent, the dishonest sender starts working in secret on a parallel chain containing an alternate version of his transaction. The recipient waits until the transaction has been added to a block and z blocks have been linked after it. He doesn't know the exact amount of progress the attacker has made, but assuming the honest blocks took the average expected time per block, the attacker's potential progress will be a Poisson distribution with expected value:

$$\lambda = z \frac{q}{p}$$

To get the probability the attacker could still catch up now, we multiply the Poisson density for each amount of progress he could have made by the probability he could catch up from that point:

$$\sum_{k=0}^{\infty} \frac{\lambda^k e^{-\lambda}}{k!} \cdot \begin{cases} (q/p)^{(z-k)} & \text{if } k \leq z \\ 1 & \text{if } k > z \end{cases}$$

Rearranging to avoid summing the infinite tail of the distribution . . .

$$1 - \sum_{k=0}^{z} \frac{\lambda^k e^{-\lambda}}{k!} \left(1 - (q/p)^{(z-k)}\right)$$

Converting to C code . . .

```
#include <math.h>
double AttackerSuccessProbability(double q, int z)
{
    double p=1.0-q;
    double lambda=z*(q/p);
    double sum=1.0;
    int i, k;
    for (k=0; k<=z; k++)
    {
        double poisson=exp(-lambda);
        for (i=1; i<=k; i++)
            poisson *=lambda/i;
        sum -=poisson*(1-pow(q/p, z-k));
    }
    return sum;
}
```

Running some results, we can see the probability drop off exponentially with z.

q=0.1
z=0    P=1.0000000
z=1    P=0.2045873
z=2    P=0.0509779
z=3    P=0.0131722
z=4    P=0.0034552
z=5    P=0.0009137
z=6    P=0.0002428
z=7    P=0.0000647
z=8    P=0.0000173
z=9    P=0.0000046
z=10   P=0.0000012 q=0.3
z=0 z=5
z=10
z=15
z=20
z=25
z=30
z=35
z=40
z=45
z=50
P=1.0000000
P=0.1773523
P=0.0416605
P=0.0101008
P=0.0024804
P=0.0006132
P=0.0001522
P=0.0000379
P=0.0000095
P=0.0000024
P=0.0000006
Solving for P less than 0.1% . . .
P < 0.001
q=0.10 z=5
q=0.15 z=8
q=0.20 z=11
q=0.25 z=15
q=0.30 z=24
q=0.35 z=41
q=0.40 z=89
q=0.45 z=340

12. CONCLUSION

We have proposed a system for electronic transactions without relying on trust. We started with the usual framework of coins made from digital signatures, which provides strong control of ownership, but is incomplete without a way to prevent double-spending. To solve this, we proposed a peer-to-peer network using proof-of-work to record a public history of transactions that quickly becomes computationally impractical for an attacker to change if honest nodes control a majority of CPU power. The network is robust in its unstructured simplicity. Nodes work all at once with little coordination. They do not need to be identified, since messages are not routed to any particular place and only need to be delivered on a best effort basis. Nodes can leave and rejoin the network at will, accepting the proof-of-work chain as proof of what happened while they were gone. They vote with their CPU power, expressing their acceptance of valid blocks by working on extending them and rejecting invalid blocks by refusing to work on them. Any needed rules and incentives can be enforced with this consensus mechanism.
8

REFERENCES

[1] W. Dai, "b-money," http://www.weidai.com/bmoney.txt, 1998.

[2] H. Massias, X. S. Avila, and J.-J. Quisquater, "Design of a secure timestamping service with minimal trust requirements," In 20th Symposium on Information Theory in the Benelux, May 1999.

[3] S. Haber, W. S. Stornetta, "How to time-stamp a digital document," In Journal of Cryptology, vol 3, no 2, pages 99-111, 1991.

[4] D. Bayer, S. Haber, W. S. Stornetta, "Improving the efficiency and reliability of digital time-stamping," In Sequences II: Methods in Communication, Security and Computer Science, pages 329-334, 1993.

[5] S. Haber, W. S. Stornetta, "Secure names for bit-strings," In Proceedings of the 4th ACM Conference on Computer and Communications Security, pages 28-35, April 1997.

[6] A. Back, "Hashcash—a denial of service countermeasure," http://www.hashcash.org/papers/hashcash.pdf, 2002.

[7] R. C. Merkle, "Protocols for public key cryptosystems," In Proc. 1980 Symposium on Security and Privacy, IEEE Computer Society, pages 122-133, April 1980.

[8] W. Feller, "An introduction to probability theory and its applications," 1957.
9
</pre>

It can thus be determined by the filter that the size of the document is 22008 bytes and the total token count is 3540 tokens.

A punctuation detector may determine from the set of token of the document that following tokens are punctuation tokens:

```
*
=
.
.
=
.
,
.
,
+
,
.
.
,
(
,
=
.
,
=
.
'
,
>
)
)
;
-
-
=
.
-
.
=
,
,
[
]
.
,
```

The punctuation detector may thus determine a count and a detector score for the document as follows:
punctuation_count: 572
punctuation_ratio: 0.1615819209039548
A numbers detector may determine from the set of token of the document that following tokens are punctuation tokens
[1],
1.0;
[1]
7
(1

1998.
2)
3,
28-35,
11.
[5]
5
365
-1.
2
4
1957.
2008,
[7]
[8]
4)
3
1997.
2,
[3]
6
9.
0.1% . . .
1991.
[2]
99-111,
1980.
1980
122-133,
1)
3.
4.
5.
1.
24
9
+1,
[6]
2.
1â
1.0
1
329-334,
6.
[6],
80
12.
2002.
3)
10
[7][2][5],
8.
1999.
[8]:
[4]
7.
1993.
1;
10.
6)
5)
0.001
The numbers detector may thus determine a count and a detector score for the document as follows:
number_count: 68
number_ratio: 0.05186880244088482

An entropy detector may determine from the set of token of the document a count and a detector score for the document as follows:
unique_term_count: 1311
unique_term_ratio: 0.37033898305084745

A gibberish detector may determine from the set of token of the document a count and a detector score for the document as follows:
gibberish_count: 0
gibberish_ratio: 0.0

An encoding detector may determine from the set of token of the document a count and a detector score for the document as follows:
basey_count: 0
basey_ratio: 0.0

Thus, when a filter applies a it can determine that the example document is longer than the MAX_FILE_SIZE threshold (e.g., 22008 byte size of the document is larger than the rules threshold of MAX_FILE_SIZE=20000). Thus, the judger may determine that the document is "LONG" and cannot be indexed. The tokens of the document of the may then be provided to a corrector configured to remove all the tokens of the document determined by the punctuation, gibberish, numbers and encoding detectors to produce the following set of tokens:
number
rules
risk
completely
vanishingly
help
header
possible
flow
privacy
further
p
ieee
while
chained
long
model
transactions
channel
past
hardware
rejoin
0002428
normally
on
already
after
favour
extended
disputes
r
output
256
secure
widely
under
value
publicly
for
his
larger
bank multi
check
steps
lunge
c
stamp
kept
cent
simplicity
the
otherwise
verify
follows
any
making
counterparty
protect
cost
other
t
choose
2gb
0
hash1
accepting
acceptance
varying
split
exponential
more
re
those
instead
absence
found
collectively
ips
so
greatest
quickly
exponentially
0416605
abstract
0000046
size
person
probability
continue
item
denial
where
framework
ought
exchanges
ruin
per
believe
than
refusing
request
4th
incomplete
finds
taking
0000006
each
buried additional
cutting
20
they
also
dropped
identified
arrived
exact
service
use
having
incrementing
gives
adds
cooperating
7
independent
cannot
happens
several
introduce
first
if
branch
sha
run
counter
leave
itself
disk
telling
include
accomplished
fastest
himself
coins
tx1
sending
power
support
correct
public
10
common
although
problem
mechanisms
download
sequences
costs
rejecting
signature
who
exp
www
longest
people
law
generate
before
modify
extending
zero
working
progress
stamping constant
handle
plays
w
changed
accomplish
incentive
lucky
record
communications
probably
difference
interior
forward
inherent
process
based
amounts
revealed
defraud
our
stubbing
trades
reliability
combined
blocks
precludes
party
strong
41
signatures
entered
simultaneously
never
success
must
p☐☐
of
0024804
now
i
routine
sellers
representation
agree
essentially
every
currency
proposed
combining
verification
uncertainties
feller
events
through
hash2
II
incentives
ever
financial
effort
contain
works
unavoidable
credit
sent
http strings
become
spending
finding
keys
smaller
15
1773523
always
involves
greedy
this
earlier
witnessed
odds
predicting
returned
h
someone
CONCLUSION
continuously
happened
different
recipient
convention
tx0
honest
is
distribute
breakeven
timestamping
old
allow
drop
do
typically
into
bmoney
just
don
vote
timestamp
Solution
generated
cash
behind
6
code
was
try
x
preparing
it
ownership
payments
point
slower
some
outputs
starts
waits
walk
maintained
catching
know
pair
pool entirely
☐k
communication
collects
else
2mb
spreads
entire
lead
almost
facilitate
still
accepted
commerce
doesn
headers
little
11
prevent
full
expected
steady
which
return
small
publishing
40
businesses
binomial
depend
going
ram
can
broken
addition
at
attackers
☐q
z
needed
delivered
breaking
assume
txt
resources
outpace
throw
0034552
drops
stealing
45
special
robust
infinite
proc
wants
hassling
computational
requires
decision
profitable
hash23
one
were
control
trusted
compacted willing
once
april
validity
miners
serves
version
between
non
two
too
released
directly
catch
nodes
does
provides
server
returning
e
basis
int
cryptology
alternate
bitcoin
0000000
institutions
signing
central
grow
electricity
deficit
messages
vulnerable
papers
relying
b
without
computer
easily
invested
paper
bayer
off
0000095
same
system
0509779
rely
weidai
vol
bit
them
payee
thetimestampprovesthatthedatamusthaveexistedatthe
stored
executing
selling
newspaper
able
valid
reliable
been
enforced
are
reverse
implemented results
massias
express
level
density
memory
individually
necessarily
over
convinced
using
minimal
j
noted
see
firewall
0101008
faster
distribution
agreed
accept
how
p☐q
secret
against
2
protocols
fee
confirm
may
invalid
arbitrary
summing
could
efficiency
overpowered
needs
current
spent
3
minimum
then
but
ability
tail
prevents
started
online
0009137
assemble
mediating
make
as
anonymous
loss
falls
chains
about
ip
purposes
necessity
stay
information
exists
com
only
pay lambda
internet
usenet
enough
attempts
air
depends
introduction
issue
becomes
catches
gambler
versions
latest
posts
linking
systems
25
begins
consider
storage
way
creator
tolerant
proof
requirements
quicker
hash0
until
rearranging
what
adam
like
he
belonged
parallel
switch
will
own
method
aware
parties
sender
alerts
earliest
longer
paid
determined
when
moving
software
banking
new
fraud
owned
1
owner
work
with
percentage
exclusively
medi extract
sufficiently
propose
and
serving
represented
institution
35
either
linked
root
change
calculate
has
ke
analogous
2045873
changes
separate
limiting
0000024
forming
items
customers
amount
chain
majority
multiply
included
0001522
society
controlled
back
reducing
fast
competing
transaction
their
reversible
stock
24
reach
calculations
reinforcing
nakamoto
receiver
redo
mechanism
8
receives
tree
race
proceedings
take
average
network
distributed
did
newspaperorusenetpost
nonce
here
electronic
single
transition
dai
security
third merchants
querying
qz
issued
provide
solving
many
cpu
announced
inconsistency
avoided
ones
document
sign
expending
20th
failure
participants
another
pruning
quisquater
gone
access
bytes
block
find
converting
gap
hour
event
prev
fees
dishonest
gold
its
attack
reversal
increasing
open
no
identities
p□□z
tx3
expended
purely
tie
everyone
took
spend
come
moore
chronological
coordination
input
fabricated
usual
would
buyers
subsequent
care
him
escrow
implement
less
be
□
case impractical
increases
targeting
wealth
received
should
org
satoshin
unlimited
avoid
private
space
peer
gmx
place
play
satisfy
encourage
k☐
possibility
transfers
determining
conference
fan
complete
added
alerted
trying
random
largest
subverted
from
next
inflation
0000647
pdf
suffers
trust
announce
potentially
since
owners
ii
late
compensate
simplified
order
k
acm
out
multiple
key
interest
89
discarded
digital
frequent
340
main
recently
keeping
certain
growth
used
sequence
node
decided
suppose
sum
payment
0000012
a
adding
creating
trials
themselves
we
reclaiming
☐
by
symposium
tape
assumption
d
benefits
that
really
given
reveal
characterized
counts
splitting
potential
not
expressing
course
scanning
journal
checks
unwieldy
9
individual
wait
end
need
hash
poisson
4
consensus
0006132
haber
predetermined
tx2
services
transact
allocate
hashing
stornetta
difficulty
generates
broadcasts
missed
add
copy
standalone
achieves
pages
early
s
attacker
running
redoing
structure
wary far
overpower
double
history
traditional
define
☐
includes
there
ahead
design
show
solve
satoshi
hashcash
have
initially
free
anyone
passed
avila
k☐z
references
save
unstructured
attackersuccessprobability
even
routed
hashed
made
applications
want
assuming
authority
detect
casual
most
50
minutes
computationally
science
to
part
mint
receive
all
q
solves
being
year
get
moment
came
user
5
time
names
rather
bits
obtain
particular
digitally
tx
timestamps
inputs
fooled
transfer difficult
reaches
money
involved
30
lost
similar
strategy
address
undermine
funded
0000379
surpass
hash3
best
allowing
these
measure
methods
theory
0000173
an
circulation
broader
keep
hashes
p☐z
scenario
benelux
practical
improving
well
branches
required
timestamped
prompting
ongoing
pow
0131722
company
in
diminishes
obviously
cryptosystems
merkle
previous
hash01
realizes
weaknesses
verified
thin
shortly
containing
or
later
go
hopes
speed
chances
up
cryptographic
fate The size of these tokens now falls below the threshold MAX_FILE_SIZE and may now be indexed.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A search system, comprising:
    a processor;
    a data store, having an index of a corpus stored thereon, wherein the corpus comprises a set of documents; and
    a non-transitory computer readable medium, having instructions executable on the processor for:
        receiving a first set of tokens for a document from a text extractor;
        providing the first set of tokens to a detector for determining if each of the received first set of tokens is of an associated type;
        determining an associated detector score based on the determination if each of the received first set of tokens is of the associated type of token, the detector score associated with the associated type;
        determining a filter score based on the detector score produced by the detector, wherein the filter score is based on a scoring rule associated with the detector or the associated type;
        determining whether the document should be indexed based on the application of a verdict rule, wherein the verdict rule includes an expression for evaluating the filter score associated with the detector; and
        when it is determined that the document should be indexed, providing the document to an indexer adapted to index the first set of tokens for the document.

2. The search system of claim 1, wherein when it is determined that the document should not be indexed, removing at least some of the first set of tokens or a second set of tokens determined by the detector from the first set of tokens to determine a third set of tokens, and indexing or discarding the document based on a suitability criteria.

3. The search system of claim 2, wherein indexing the document comprises indexing the first set of tokens or third set of tokens.

4. The search system of claim 2, wherein the first set of tokens or the second set of tokens is removed based on a correction specification specifying an attribute or type of token to remove.

5. The search system of claim 2, wherein an altered document comprising the third set of tokens is created.

6. The search system of claim 1, wherein the associated type comprises an attribute or type that is associated with a token or the document.

7. The search system of claim 1, wherein the suitability criteria is document size or a number of the third tokens.

8. A non-transitory computer readable medium, comprising instructions for:
receiving a first set of tokens for a document from a text extractor, wherein the document is one of a corpus of documents associated with an index;
providing the first set of tokens to a detector for determining if each of the received first set of tokens is of an associated type;
determining an associated detector score based on the determination if each of the received first set of tokens is of the associated type of token, the detector score associated with the associated type;
determining a filter score based on the detector score produced by the detector, wherein the filter score is based on a scoring rule associated with the detector or the associated type;
determining whether the document should be indexed based on the application of a verdict rule, wherein the verdict rule includes an expression for evaluating the filter score associated with the detector; and
when it is determined that the document should be indexed, providing the document to an indexer adapted to index the first set of tokens for the document.

9. The non-transitory computer readable medium of claim 8, wherein when it is determined that the document should not be indexed, removing at least some of the first set of tokens or a second set of tokens determined by the detector from the first set of tokens to determine a third set of tokens, and indexing or discarding the document based on a suitability criteria.

10. The non-transitory computer readable medium of claim 9, wherein indexing the document comprises indexing the first set of tokens or third set of tokens.

11. The non-transitory computer readable medium of claim 9, wherein the first set of tokens or the second set of tokens is removed based on a correction specification specifying an attribute or type of token to remove.

12. The non-transitory computer readable medium of claim 9, wherein an altered document comprising the third set of tokens is created.

13. The non-transitory computer readable medium of claim 8, wherein the associated type comprises an attribute or type that is associated with a token or the document.

14. The non-transitory computer readable medium of claim 8, wherein the suitability criteria is document size or a number of the third tokens.

15. A method, comprising:
receiving a first set of tokens for a document from a text extractor, wherein the document is one of a corpus of documents associated with an index;
providing the first set of tokens to a detector for determining if each of the received first set of tokens is of an associated type;
determining an associated detector score based on the determination if each of the received first set of tokens is of the associated type of token, the detector score associated with the associated type;
determining a filter score based on the detector score produced by the detector, wherein the filter score is based on a scoring rule associated with the detector or the associated type;
determining whether the document should be indexed based on the application of a verdict rule, wherein the verdict rule includes an expression for evaluating the filter score associated with the detector; and
when it is determined that the document should be indexed, providing the document to an indexer adapted to index the first set of tokens for the document.

16. The method of claim 15, wherein when it is determined that the document should not be indexed, removing at least some of the first set of tokens or a second set of tokens determined by the detector from the first set of tokens to determine a third set of tokens, and indexing or discarding the document based on a suitability criteria.

17. The method of claim 16, wherein indexing the document comprises indexing the first set of tokens or third set of tokens.

18. The method of claim 16, wherein the first set of tokens or the second set of tokens is removed based on a correction specification specifying an attribute or type of token to remove.

19. The method of claim 16, wherein an altered document comprising the third set of tokens is created.

20. The method of claim 15, wherein the associated type comprises an attribute or type that is associated with a token or the document.

21. The method of claim 15, wherein the suitability criteria is document size or a number of the third tokens.

* * * * *